US009361175B1

United States Patent
Bose et al.

(10) Patent No.: US 9,361,175 B1
(45) Date of Patent: Jun. 7, 2016

(54) DYNAMIC DETECTION OF RESOURCE MANAGEMENT ANOMALIES IN A PROCESSING SYSTEM

(71) Applicant: International Business Machines Corporation, Armonk, NY (US)

(72) Inventors: Pradip Bose, Yorktown Heights, NY (US); Alper Buyuktosunoglu, White Plains, NY (US); Augusto J. Vega, Dobbs Ferry, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/960,585

(22) Filed: Dec. 7, 2015

(51) Int. Cl.
  *G06F 11/00* (2006.01)
  *G06F 11/07* (2006.01)
  *G06F 11/30* (2006.01)
  *G06F 11/34* (2006.01)

(52) U.S. Cl.
  CPC .......... *G06F 11/0793* (2013.01); *G06F 11/079* (2013.01); *G06F 11/0751* (2013.01); *G06F 11/0787* (2013.01); *G06F 11/3055* (2013.01); *G06F 11/3062* (2013.01); *G06F 11/3409* (2013.01)

(58) Field of Classification Search
  CPC ............ G06F 11/3055; G06F 11/3062; G06F 11/0793; G06F 11/079; G06F 11/3089
  See application file for complete search history.

(56) References Cited

U.S. PATENT DOCUMENTS

| 5,363,505 A | * | 11/1994 | Maslak | G06F 9/466 709/226 |
| 5,500,940 A | * | 3/1996 | Skeie | G06F 11/22 714/25 |
| 6,233,623 B1 | * | 5/2001 | Jeffords | G06F 9/50 711/173 |
| 8,402,540 B2 | | 3/2013 | Kapoor et al. | |
| 8,811,377 B1 | | 8/2014 | Weston et al. | |
| 8,886,980 B2 | | 11/2014 | Kulik | |

(Continued)

FOREIGN PATENT DOCUMENTS

CN 103207601 A 7/2013
KR 20140073043 A 6/2014

OTHER PUBLICATIONS

Brandt et al., "Resource monitoring and management with OVIS to enable HPC in cloud computing environments," Parallel & Distributed Processing, IEEE, May 2009, pp. 1-8.

(Continued)

*Primary Examiner* — Yolanda L Wilson
(74) *Attorney, Agent, or Firm* — Cantor Colburn LLP

(57) ABSTRACT

According to an aspect, dynamic detection of resource management anomalies in a processing system includes collecting data from a plurality of on-line data sources on the processing system. The collected data includes performance data and power consumption data. Anomalous operation of a resource manager of the processing system is identified based on the collected data from the on-line data sources. The identification of the anomalous operation is conducted absent a baseline of reference performance data. A corresponding palliative action is initiated based on identifying the anomalous operation.

20 Claims, 4 Drawing Sheets

(56) References Cited

U.S. PATENT DOCUMENTS

| | | | | |
|---|---|---|---|---|
| 2002/0054477 | A1* | 5/2002 | Coffey | G06F 11/0727 361/679.45 |
| 2010/0205137 | A1* | 8/2010 | Barsness | G06F 1/3203 706/52 |
| 2010/0229023 | A1* | 9/2010 | Gross | G06F 11/0724 714/2 |
| 2011/0093588 | A1* | 4/2011 | Karayi | G06F 1/3209 709/224 |
| 2012/0173927 | A1* | 7/2012 | Rymeski | G06F 11/0709 714/26 |
| 2013/0173322 | A1 | 7/2013 | Gray | |
| 2013/0246001 | A1* | 9/2013 | Uchida | G06F 11/3055 702/182 |
| 2014/0325481 | A1* | 10/2014 | Pillai | G06F 11/3409 717/124 |
| 2016/0011894 | A1* | 1/2016 | Reddy | H04L 67/38 718/1 |

OTHER PUBLICATIONS

Grok, Grok 1.6 Getting Insights from Grok, Updated: Nov. 19, 2014, 6 pages.

Rajasegarar et al., "Anomaly detection in wireless sensor networks," Wireless Communications, IEEE, Aug. 2008, pp. 34-40.

Sharma et al., "CloudPD: Problem determination and diagnosis in shared dynamic clouds," Dependable Systems and Networks (DSN) 43rd Annual IEEE/IFIP International Conference. IEEE, Jun. 2013, pp. 1-12.

* cited by examiner

US 9,361,175 B1

DYNAMIC DETECTION OF RESOURCE MANAGEMENT ANOMALIES IN A PROCESSING SYSTEM

GOVERNMENT RIGHTS

This invention was made with government support under contract number HR0011-13-C-0022 awarded by the Defense Advanced Research Projects Agency (DARPA). The government has certain rights in the invention.

BACKGROUND

The present invention relates generally to computer systems, and more particularly to dynamic detection of resource management anomalies in a processing system.

In computer systems that include dynamic resource management, power and performance can be dynamically adjusted during system operation. Power management and performance management can impact overall computer system operating costs, processing system responsiveness, and expected operating life of individual components or subsystems. Some computer systems support dynamic power management by including multiple independent power control actuators. Power control actuators are typically incorporated into independently architected control loops with single actuators, such as a dynamic voltage and frequency scaling (DVFS) actuator and a per-core power gating (PCPG) actuator. A DVFS actuator can control voltage and frequency of a processor. A PCPG actuator can turn power on or off for individual processor cores of a multi-core processor. Although DVFS and PCPG can be effective in managing power and performance, it is possible that power management efforts may unintentionally reduce performance under certain operating scenarios that can be difficult to predict.

SUMMARY

According to one embodiment, a method for dynamic detection of resource management anomalies in a processing system includes collecting data from a plurality of on-line data sources on the processing system. The collected data includes performance data and power consumption data. Anomalous operation of a resource manager of the processing system is identified based on the collected data from the on-line data sources. The identification of the anomalous operation is conducted absent a baseline of reference performance data. A corresponding palliative action is initiated based on identifying the anomalous operation.

According to another embodiment, a processing system includes a plurality of on-line data sources, a resource manager, and a resource manager monitor. The resource manager monitor collects data from the on-line data sources including performance data and power consumption data, identifies anomalous operation of the resource manager based on the collected data, and initiates a corresponding palliative action based on identifying the anomalous operation of the resource manager. The identification of the anomalous operation is conducted absent a baseline of reference performance data.

According to a further embodiment, a computer program product is provided. The computer program product includes a computer readable storage medium having program instructions embodied therewith. The program instructions are executable by a processor to cause the processor to collect data from a plurality of on-line data sources on the processing system, where the collected data includes performance data and power consumption data. Anomalous operation of a resource manager of the processing system is identified based on the collected data from the on-line data sources. The identification of the anomalous operation is conducted absent a baseline of reference performance data. A corresponding palliative action is initiated based on identifying the anomalous operation.

DETAILED DESCRIPTION

An embodiment is directed to determining whether power and performance management features of a computer system are operating correctly. Embodiments can detect whether dynamic power management features of a resource manager of a computer system are malfunctioning such that the dynamic power management features degrade computer system performance. As one example, an operations-per-unit time metric of performance (e.g., Giga-operations per second) can be combined with a power metric (e.g., Watts) to create an efficiency metric. The efficiency metric can be monitored, for instance, to determine whether a decrease in power occurs while the performance metric remains consistent within a threshold level. A significant decrease in power with substantially constant performance may indicate that the power reduction has been forced instead of being a consequence of a drop in performance. Palliative actions can be taken in response to identifying anomalous operation of the resource manager, such as issuing a notification and/or disabling the resource manager.

Figure 1:
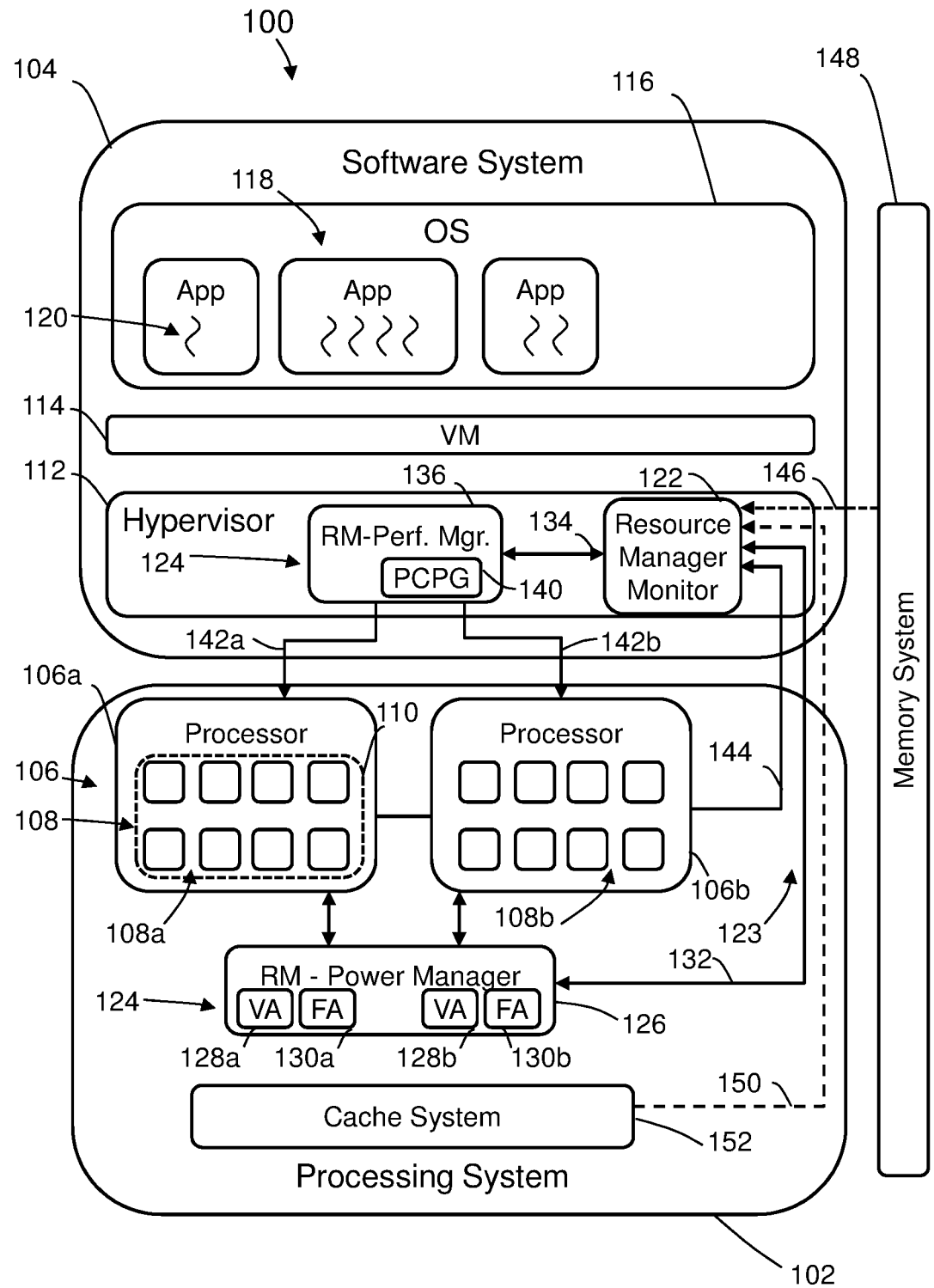
FIG. 1 illustrates a block diagram of a system in accordance with an embodiment.

Turning to FIG. 1, an example of a multi-core processing system 100 is depicted according to an embodiment. The multi-core processing system 100 includes a processing system 102 and a software system 104. The processing system 102 can include a plurality of multi-core processors 106, such as multi-core processors 106a and 106b. Each of the multi-core processors 106 includes two or more processor cores 108. In the example of FIG. 1, multi-core processor 106a includes eight processor cores 108a and multi-core processor 106b includes eight processor cores 108b. Power management can be performed on a processor basis, a core basis, and/or a power management group basis. A power management group can consider a number of the processor cores 108 for power adjustment scenario identification and a power adjustment action. In the example of FIG. 1, a power management group 110 is defined as all eight processor cores 108a of multi-core processor 106a. Alternatively, the power management group 110 could be defined for a subset of the processor cores 108a or span to include one or more of the processor cores 108b of the multi-core processor 106b. One or more separate power management groups (not depicted) may be defined for the processor cores 108b.

The software system 104 may include a hypervisor 112, a virtual machine 114, and an operating system 116. The hypervisor 112 can create and run the virtual machine 114 to provide a virtual operating platform to the operating system 116. The hypervisor 112 may also support additional virtual machines and operating systems (not depicted). The operating system 116 can support a number of applications 118 that may each include one or more threads 120. Execution of the threads 120 may be distributed between a number of the processor cores 108.

In an exemplary embodiment, a resource manager monitor 122 is configured to collect data from on-line data sources 123, including performance data and power consumption data, to monitor the performance of one or more resource managers 124 of the processing system 102. In the example of FIG. 1, the resource manager monitor 122 is part of the hypervisor 112 and is operably coupled to at least two resource managers 124. The resource manager monitor 122 and the resource managers 124 can be hardware or software based. Resource managers 124 can be combined or further subdivided.

In the example of FIG. 1, a power manager 126 can include a voltage and frequency controller that is a separately configurable control device that establishes a voltage and operating frequency for the multi-core processors 106 to provide dynamic voltage and frequency scaling (DVFS). The power manager 126 can include a first voltage adjustment actuator 128a and a first frequency adjustment actuator 130a for the multi-core processor 106a. The power manager 126 can also include a second voltage adjustment actuator 128b and a second frequency adjustment actuator 130b for the multi-core processor 106b. The resource manager monitor 122 can observe power consumption data 132 of the power manager 126, such as Watts, as one example of the on-line data sources 123. In embodiments that support multiple power management groups 110 per multi-core processor 106, additional instances of the voltage and frequency adjustment actuators 128a, 128b, 130a, 130b can be incorporated into the power manager 126. In an embodiment where a single power management group 110 spans all multi-core processors 106, the second voltage adjustment actuator 128b and the second frequency adjustment actuator 130b can be omitted.

The resource manager monitor 122 can also receive performance data 134 from a performance manager 136 as another example of the on-line data sources 123. The performance manager 136 may be software based and include multiple performance actuators. In the example of FIG. 1, the performance manager 136 includes a per-core power gating (PCPG) actuator 140. Alternatively, the PCPG 140 actuator can be part of the power manager 126. There may be separate instances of the PCPG actuator 140 for each power management group 110, or the PCPG actuator 140 can be selectively driven to one or more specific power management group 110. The performance manager 136 can drive output of PCPG actuator 140 as core commands 142a to multi-core processor 106a or core commands 142b to multi-core processor 106b. In an embodiment, the PCPG actuator 140 turns power to the processor cores 108 on or off which may be performed as a workload consolidation or workload spreading process to adjust performance of the processing system 102 by adding or removing processing capacity.

The resource manager monitor 122 may monitor workload characteristics in the multi-core processing system 100, such as a level of processor core utilization 144 in the multi-core processors 106, to identify a performance metric, such as Giga-operations per second (GOPS). Other inputs can be used to supplement the performance determination or as an alternate performance indicator. In one example, the resource manager monitor 122 can monitor various workload characteristics in combination with or as an alternative to the level of processor core utilization 144, such as memory system activity 146 of a memory system 148 and/or cache system activity 150 of a cache system 152. The memory system activity 146 and/or the cache system activity 150 are further examples of on-line data sources 123 that can also or alternatively be used as an indication of a current phase of execution. For instance, if processing is likely being stalled to service a number of accesses to the memory system 148, then an operating frequency may be expected to be reduced to a lower power using either the first or second frequency adjustment actuator 130a, 130b. The memory system 148 can include a combination of various types of computer readable storage media, e.g., solid-state memory, secondary storage, and the like, to store executable instructions for the software system 104 and associated data. The cache system activity 150 may be an indication of a miss rate of the cache system 152, which can result in slower accesses to the memory system 148 and thereby lowering associated processing core demands. Additionally, depending upon the particular resource manager 124, monitoring of workload characteristics and taking particular actions can occur at different rates, e.g., power manager 126 may support a higher update rate than the performance manager 136.

Figure 2:
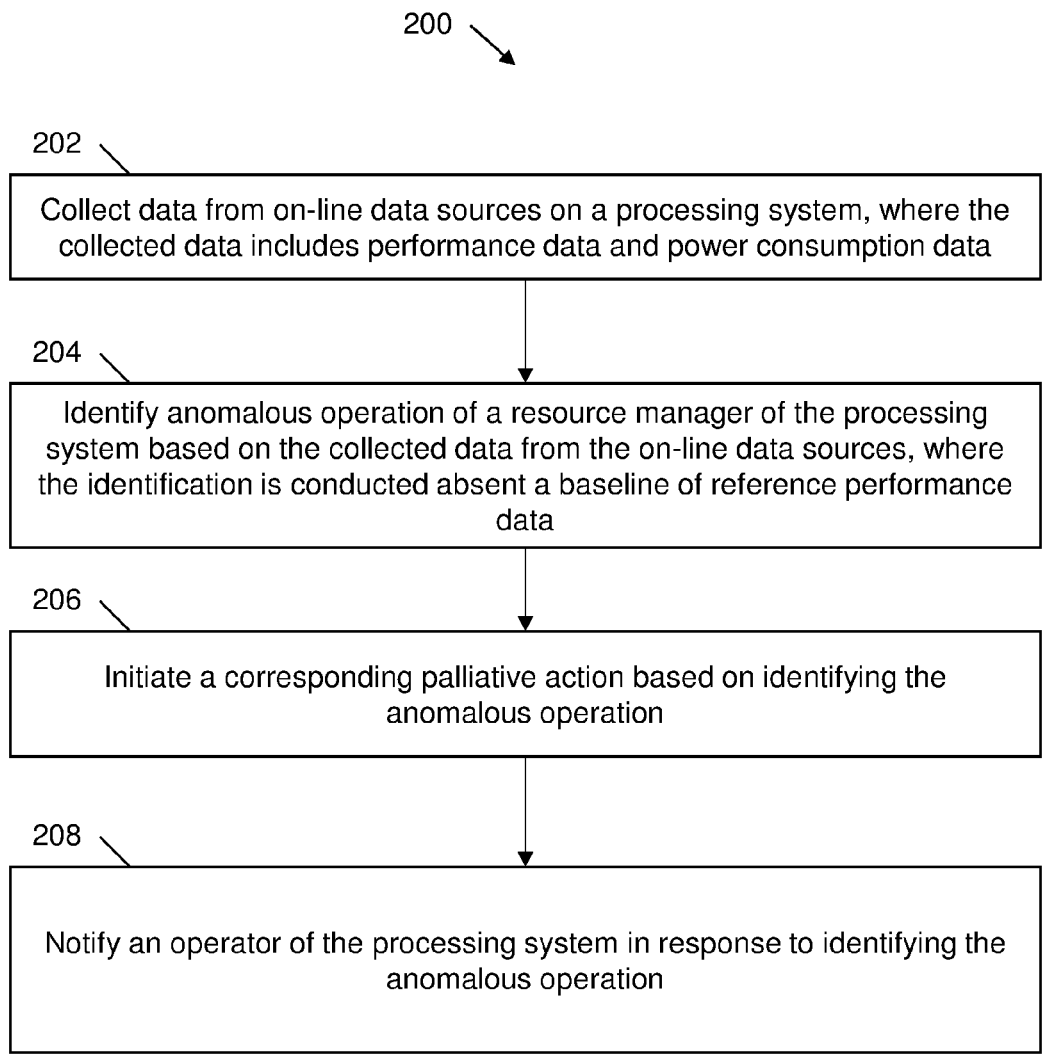
FIG. 2 is a process flow diagram for dynamic detection of resource management anomalies in a processing system in accordance with an embodiment.

FIG. 2 depicts a high-level process flow diagram for dynamic detection of resource management anomalies in accordance with an embodiment. Process 200 of FIG. 2 is a method that can be performed by the resource manager monitor 122 of FIG. 1 or other configurations (not depicted). For ease of explanation, the process 200 is described in reference to the resource manager monitor 122 of the multi-core processing system 100 FIG. 1.

At block 202, the resource manager monitor 122 collects data from a plurality of on-line data sources 123 on the multi-core processing system 100. The collected data can include performance data 134 and power consumption data 132. The on-line data sources 123 are sensed parameters of a current operating state of the multi-core processing system 100.

At block 204, the resource manager monitor 122 identifies anomalous operation of a resource manager 124 of the multi-core processing system 100 based on the collected data from the on-line data sources 123. The resource manager 124 can include power manager 126 and performance manager 136. The resource manager monitor 122 can identify anomalous operation by applying machine learning-like techniques, such as statistical analysis, artificial neural networks, and genetic algorithms, among others. Where a baseline of reference performance data are not available (i.e., absent), outlier detection can be performed. Identifying the anomalous operation may include tracking a normal behavior duration for periods of time without detecting the anomalous operation and tracking an abnormal behavior duration for periods of time where the anomalous operation is detected over multiple iterations as further described with respect to FIGS. 3 and 4.

At block 206, the resource manager monitor 122 or other controller of the multi-core processing system 100 can initiate a corresponding palliative action based on identifying the anomalous operation of a resource manager 124. The anomalous operation can be identified when a ratio of the performance to the power consumption exceeds a threshold value. A sudden and significant decrease in power with a substantially constant performance metric (e.g., GOPS) can indicate that a resource manager 124 is misbehaving by forcing the power lower without a corresponding drop in performance. For example, the resource manager 124 can reduce the frequency of the processor during a CPU-intensive execution phase of the running workload. The corresponding palliative action may include disabling the resource manager 124 associated with the anomalous operation.

At block 208, the resource manager monitor 122 or other controller of the multi-core processing system 100 can notify an operator of the multi-core processing system 100 in response to identifying the anomalous operation.

Figure 3:
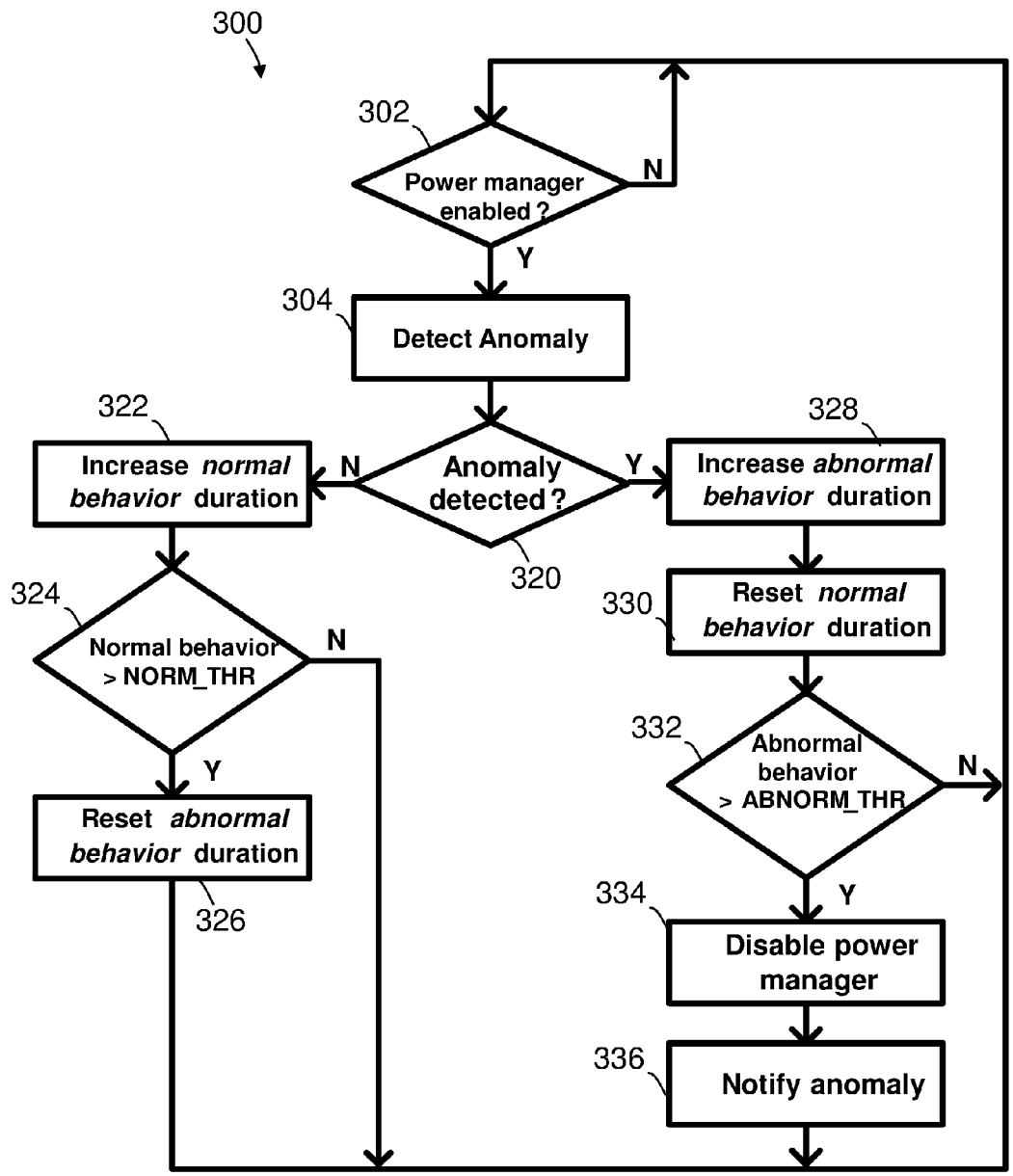
FIG. 3 is a process flow diagram for dynamic detection of resource management anomalies using multiple counters in accordance with an embodiment.

FIG. 3 is a detailed example of a process flow diagram for dynamic detection of resource management anomalies using multiple counters in accordance with an embodiment. A process 300 of FIG. 3 is a method that can be performed by the resource manager monitor 122 of FIG. 1 or other configurations (not depicted). For ease of explanation, the process 300 is described in reference to the resource power manager 122 of the multi-core processing system 100 FIG. 1.

At block 302, a check is performed to determine whether power manager 126 is enabled. If power manager 126 is enabled, the anomaly detection can be performed at block 304. One example of block 304 is provided in FIG. 4, where performance data 134 is read at block 306, power consumption data 132 is read at block 308, and a comparison is performed at block 310 to determine whether a ratio of the performance to the power consumption exceeds a threshold value. If the ratio of the performance to the power consumption exceeds the threshold value, then anomalous operation is identified at block 312; otherwise, no anomaly is indicated at block 314.

Figure 4:
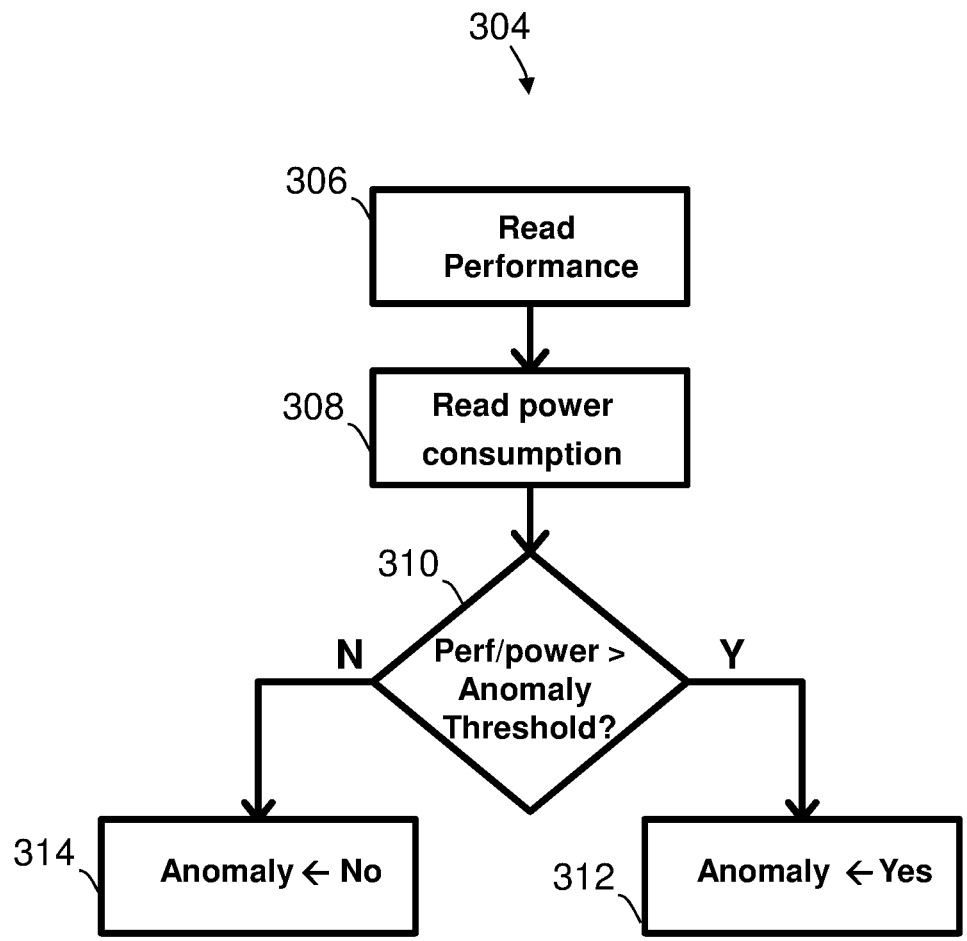
FIG. 4 is a detailed example of a process flow diagram for anomaly detection in accordance with an embodiment.

With continued reference to FIG. 3, block 320 can determine whether an anomaly was detected (e.g., based on blocks 312 and 314 of FIG. 4). If there is no anomaly detected at block 320, then a normal behavior duration counter is incremented at block 322. If the normal behavior duration counter exceeds a normal duration threshold at block 324, then an abnormal duration counter is reset at block 326 and processing returns to block 302. If the normal behavior duration counter does not exceed the normal duration threshold at block 324, then processing returns to block 302.

If there is an anomaly detected at block 320, then the abnormal behavior duration counter is incremented at block 328 and the normal behavior duration counter is reset at block 330. If the abnormal behavior duration counter exceeds an abnormal duration threshold at block 332, then the power manager 126 can be disabled at block 334, notification of the anomaly may be performed at block 336, and processing returns to block 302. If the abnormal behavior duration counter does not exceed the abnormal duration threshold at block 332, then processing returns to block 302.

The use of the normal behavior duration counter and abnormal behavior duration counter in process 300 can be used to track normal behavior duration for periods of time without detecting the anomalous operation and an abnormal behavior duration for periods of time where the anomalous operation is detected over multiple iterations. This can help ensure that a temporary anomaly does not result in disabling the power manager 126.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for dynamic detection of resource management anomalies in a processing system, the method comprising:
   collecting data from a plurality of on-line data sources on the processing system, the collected data comprising performance data and power consumption data;
   identifying anomalous operation of a resource manager of the processing system based on the collected data from the on-line data sources, the identifying conducted absent a baseline of reference performance data; and
   initiating a corresponding palliative action based on identifying the anomalous operation.

2. The method of claim 1, wherein the on-line data sources are sensed parameters of a current operating state of the processing system.

3. The method of claim 1, wherein the resource manager is one of a power manager and a performance manager.

4. The method of claim 1, wherein the anomalous operation is identified when a ratio of the performance to the power consumption exceeds a threshold value.

5. The method of claim 1, further comprising notifying an operator of the processing system in response to identifying the anomalous operation.

6. The method of claim 1, wherein the corresponding palliative action comprises disabling the resource manager.

7. The method of claim 1, wherein identifying the anomalous operation further comprises applying machine learning-like techniques.

8. The method of claim 1, wherein identifying the anomalous operation further comprising tracking a normal behavior duration for periods of time without detecting the anomalous operation and an abnormal behavior duration for periods of time where the anomalous operation is detected over multiple iterations.

9. A processing system comprising:
   a plurality of on-line data sources;
   a resource manager; and
   a resource manager monitor that collects data from the on-line data sources comprising performance data and power consumption data, identifies anomalous operation of the resource manager based on the collected data, and initiates a corresponding palliative action based on identification of the anomalous operation of the resource manager, wherein identification of the anomalous operation is conducted absent a baseline of reference performance data.

10. The processing system of claim 9, wherein the on-line data sources are sensed parameters of a current operating state of the processing system.

11. The processing system of claim 9, wherein the resource manager is one of a power manager and a performance manager.

12. The processing system of claim 9, wherein the anomalous operation is identified when a ratio of the performance to the power consumption exceeds a threshold value.

13. The processing system of claim 9, wherein the corresponding palliative action comprises disabling the resource manager.

14. The processing system of claim 9, wherein identifying the anomalous operation further comprises applying machine learning-like techniques.

15. The processing system of claim 9, wherein identifying the anomalous operation further comprising tracking a normal behavior duration for periods of time without detecting the anomalous operation and an abnormal behavior duration for periods of time where the anomalous operation is detected over multiple iterations.

16. A computer program product comprising a computer readable storage medium having program instructions embodied therewith, the program instructions executable by a processor to cause the processor to:
   collect data from a plurality of on-line data sources on the processing system, the collected data comprising performance data and power consumption data;
   identify anomalous operation of a resource manager of the processing system based on the collected data from the on-line data sources, the identification conducted absent a baseline of reference performance data; and
   initiate a corresponding palliative action based on the identification of the anomalous operation.

17. The computer program product of claim 16, wherein the anomalous operation is identified when a ratio of the performance to the power consumption exceeds a threshold value.

18. The computer program product of claim 16, wherein the corresponding palliative action comprises disabling the resource manager.

19. The computer program product of claim 16, wherein identifying the anomalous operation further comprises applying machine learning-like techniques.

20. The computer program product of claim 16, wherein identifying the anomalous operation further comprising tracking a normal behavior duration for periods of time without detecting the anomalous operation and an abnormal behavior duration for periods of time where the anomalous operation is detected over multiple iterations.

* * * * *